(12) United States Patent
Cole et al.

(10) Patent No.: US 8,996,441 B2
(45) Date of Patent: Mar. 31, 2015

(54) SYSTEM AND METHOD FOR GOVERNING DATA ENTRY INTO A NETWORK DATABASE BY MULTIPLE ENTITIES HAVING VARYING DATA REQUIREMENTS

(71) Applicant: Solid Earth, Inc., Huntsville, AL (US)

(72) Inventors: John Cole, Huntsville, AL (US); Mete Kamil, Meridianville, AL (US); Ron Litzenberger, Huntsville, AL (US)

(73) Assignee: Solid Earth, Inc., Huntsville, AL (US)

( * ) Notice: Subject to any disclaimer, the term of this patent is extended or adjusted under 35 U.S.C. 154(b) by 0 days.

(21) Appl. No.: 13/770,642

(22) Filed: Feb. 19, 2013

(65) Prior Publication Data

US 2014/0236909 A1     Aug. 21, 2014

(51) Int. Cl.
G06F 17/30 (2006.01)
G06N 5/04 (2006.01)

(52) U.S. Cl.
CPC .......... *G06F 17/30563* (2013.01); *G06N 5/046* (2013.01); *G06N 5/04* (2013.01)
USPC .............................................. 706/47; 706/45

(58) Field of Classification Search
None
See application file for complete search history.

(56) References Cited

U.S. PATENT DOCUMENTS

| 5,826,250 | A | 10/1998 | Trefler |
| 6,163,844 | A | 12/2000 | Duncan et al. |
| 7,984,513 | B1 | 7/2011 | Kyne et al. |
| 8,103,607 | B2 | 1/2012 | Schneider |
| 8,490,171 | B2* | 7/2013 | Harrison et al. ................ 726/12 |
| 2007/0233902 | A1 | 10/2007 | Trefler et al. |

* cited by examiner

*Primary Examiner* — Wilbert L Starks
(74) *Attorney, Agent, or Firm* — George P. Kobler; Lanier Ford Shaver & Payne P.C.

(57) ABSTRACT

A system for governing entry of data into a database commonly accessible by a plurality of entities, each of which has requirements for its data that differ from the requirements of other entities, comprised one or more rules base servers for storing a rules base data structure. The data structure is a collection of documents which are either a rule applicable to an entity or a rules interface which provides a navigation route to an applicable rule. The system includes a rules engine which executes an algorithm that recursively searches the documents in the rules base, evaluating each document until a rule is found, executing the rule, and storing the result returned by the executed rule, until all applicable rules for the entity submitting the set of data are executed.

14 Claims, 9 Drawing Sheets

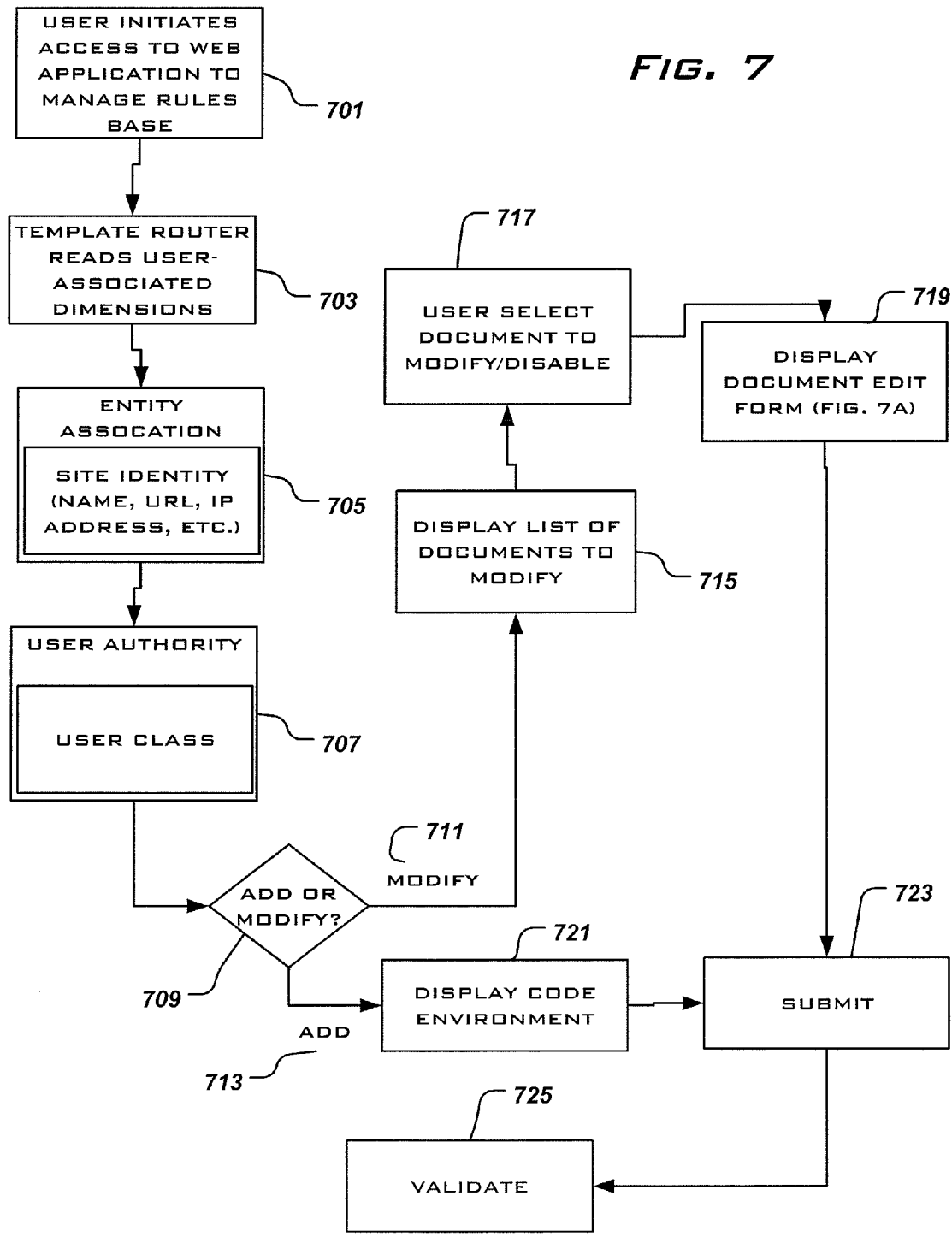

SYSTEM AND METHOD FOR GOVERNING DATA ENTRY INTO A NETWORK DATABASE BY MULTIPLE ENTITIES HAVING VARYING DATA REQUIREMENTS

BACKGROUND

1. Field

The system and method relates generally to management of a single database accessible over a network by multiple unique entities and particularly to data entry into a single database accessible a unique entity, and each unique entity defines unique database data criteria.

2. Description of the Problem and Related Art

Databases for storing vast amounts of information are ubiquitous, and are created, populated, and modified constantly, typically through a network of computer-based devices. Databases typically providing information in response to a user query and compiled from data entered into the database.

One example is a web-accessible Multiple Listing Service ("MLS") that comprises a database of real property for sale in a given geographic area and may be queried by real estate brokers, agents, buyers or sellers, to find information relating to such property. Such information includes, the type of property, whether commercial, residential, unimproved land, rental, condominium, or detached house, etc., the approximate area of the property or within any structure on the property (e.g, the approximate square footage with the living spaces of a house or condo), the number of rooms in a house, the number of bedrooms/bathrooms, the types of rooms (e.g., den, kitchen, living room, etc.), room dimensions, asking price, amenities, seller conditions, school/political district, and even photographic images of the property. Typically, an MLS listing properties for sale in a given geographic region is proprietary to a real estate professional organization, or realtor association, associated with that geographic region. For example, the MLS covering properties for sale in Charlotte, N.C., is controlled by the Charlotte Regional Realtor Association, and San Diego Association of Realtors controls the MLS for San Diego, Calif.

Conventionally, each MLS is maintained in a self-contained, stand alone database and data corresponding to property listings is entered by real estate brokers, real estate agents, or other users acting on their behalf, with association-sanctioned authority to enter such data. MLS databases are conventionally created by companies that provide MLS database programming and maintenance services. However, usually such companies have to create, and manage an individual, stand-alone database for each realty association. The population of data into each database must be constructed individually.

Efforts to unite MLS databases have been underway by such database service companies to create a single master database comprising the multiple individual MLS databases, in order to reduce the time, cost and complexity of multiple database management. However, a major obstacle to this effort has been, until now, that each realty association has differing criteria for the data that may be entered into its respective MLS. Such criteria may be defined by the association itself, or may be required by municipal, state statute or regulation, or required by other governing bodies. Such criteria may include the type of data that may entered into an MLS listing, or the values that may be entered. In other words, individual associations have myriad different rules, making the creation or maintenance of a single database of multiple MLS's tedious, if not infeasible.

Rules engines, or expert systems, have evolved to construe requests for information and to provide information stored in a knowledge according to a set of rules that determine what information is relevant to the request. Typically, rules engines access a data structure comprised of rules that consist of data or information, and, in response to a query from a user, the rules engine calls and executes the relevant rule, or rules, which are essentially computer programs containing logical syllogisms that govern the retrieval and return of information in response to the query. One obvious example of such a rules engine is an internet search engine. Another example is found in U.S. Pat. No. 5,826,250, by Trefler, teaches a rules database for retrieving data in response to a query where the database is configured with separate records with fields for a data objective, e.g., "loan rate", one or more circumstances in which to apply a rule and one or more rules applicable to a given circumstance that meets the data objective. In this situation, rules may differ depending on circumstance, e.g., by geographic area. The record includes a field that indicates whether the rule is valid for the circumstance in which the record is called, or whether a record is "inherited" or whether there is another record that defines a rule that also applies. Accordingly, for a rules engine to navigate this database, it must parse a record and if another record is indicated it must then search for the "ancestral" or superior record. While this database may comprise different rules associated with different "circumstances", it suffers from the obvious shortcoming that each record must be coded and maintained not only to apply the correct rule, but to insure that the required hierarchy of circumstances is maintained. In a case in which different entities define different rules, this becomes so cumbersome as to be infeasible. Moreover, such a database design requires a large amount of memory, and accordingly lacks scalability to encompass multiple sets of circumstances.

Other rules engines have been developed to validate access rights to a network application or database, as taught in U.S. Pat. No. 6,163,844, to Duncan, et al., and U.S. Pat. No. 7,984,513, to Kyne, et al. Another system, disclosed in U.S. Pat. No. 8,103,607, to Schneider, uses a rules engine to choose and execute auxiliary programming functions that apply to one or more core functions of an executed application.

None of these solutions, however, address the problem of entering into and maintaining data in a common database where criteria governing acceptable data types and values vary depending on the entity accessing the database. Data entry for single databases for a single entity is currently validated according to a rules engine, typified by the familiar instance of registering for some account online wherein the user is warned and prevented from registration if the user fails to enter data into a required field. Again, however, these instances apply to a single entity governing a single database. Governing data entry into a single database where the data is entered by users associated with different entities whose data requirements are varied has heretofore been too complex to render a feasible solution.

BRIEF DESCRIPTION OF THE DRAWINGS

The system and method is described with reference to the accompanying drawings. In the drawings, like reference numbers indicate identical or functionally similar elements. Additionally, the left-most digit(s) of a reference number identifies the drawing in which the reference number first appears.

FIG. 7 is a flowchart of another exemplary method executed by the rules engine for amending or adding documents to the rules base;

DETAILED DESCRIPTION

Figure 1:
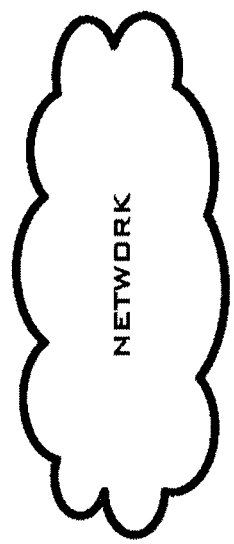
FIG. 1 is an illustration of an exemplary network system.

The various embodiments and their advantages are best understood by referring to FIGS. 1 through 8 of the drawings. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment of the system and method. Thus, the appearance of the phrases "in one embodiment," "in another embodiment," or variations thereof in various places throughout the specification are not necessarily all referring to its respective embodiment.

This system and method may be provided in other specific forms and embodiments without departing from the essential characteristics as described herein. The embodiments described above are to be considered in all aspects as illustrative only and not restrictive in any manner. The appended claims rather than the present description indicate the scope of the invention as may be construed according to applicable law.

In the following description, numerous details are set forth. It will be apparent, however, to one skilled in the art, that the system and method may be practiced without these specific details. In some instances, well-known structures and devices are shown in block diagram form, rather than in detail, in order to avoid obscuring the system and method.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing", "forwarding", "receiving", "performing", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The functions of the system are performed on an apparatus comprising an interconnected collection of machines configured for performing the operations disclosed herein. This apparatus may be specially constructed for the required purposes, or it may comprise one or more general purpose computer systems selectively activated or reconfigured by a computer program stored memory. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the system and method is not described with reference to any particular programming language. It will be appreciated that a variety of programming languages may be used to implement the teachings described herein.

Functions performed by the system may be provided as a computer program product, or software, that may include a machine-readable medium having stored thereon instructions, which may be used to program a computer system (or other electronic devices) to perform a process according to the system and method. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 2:
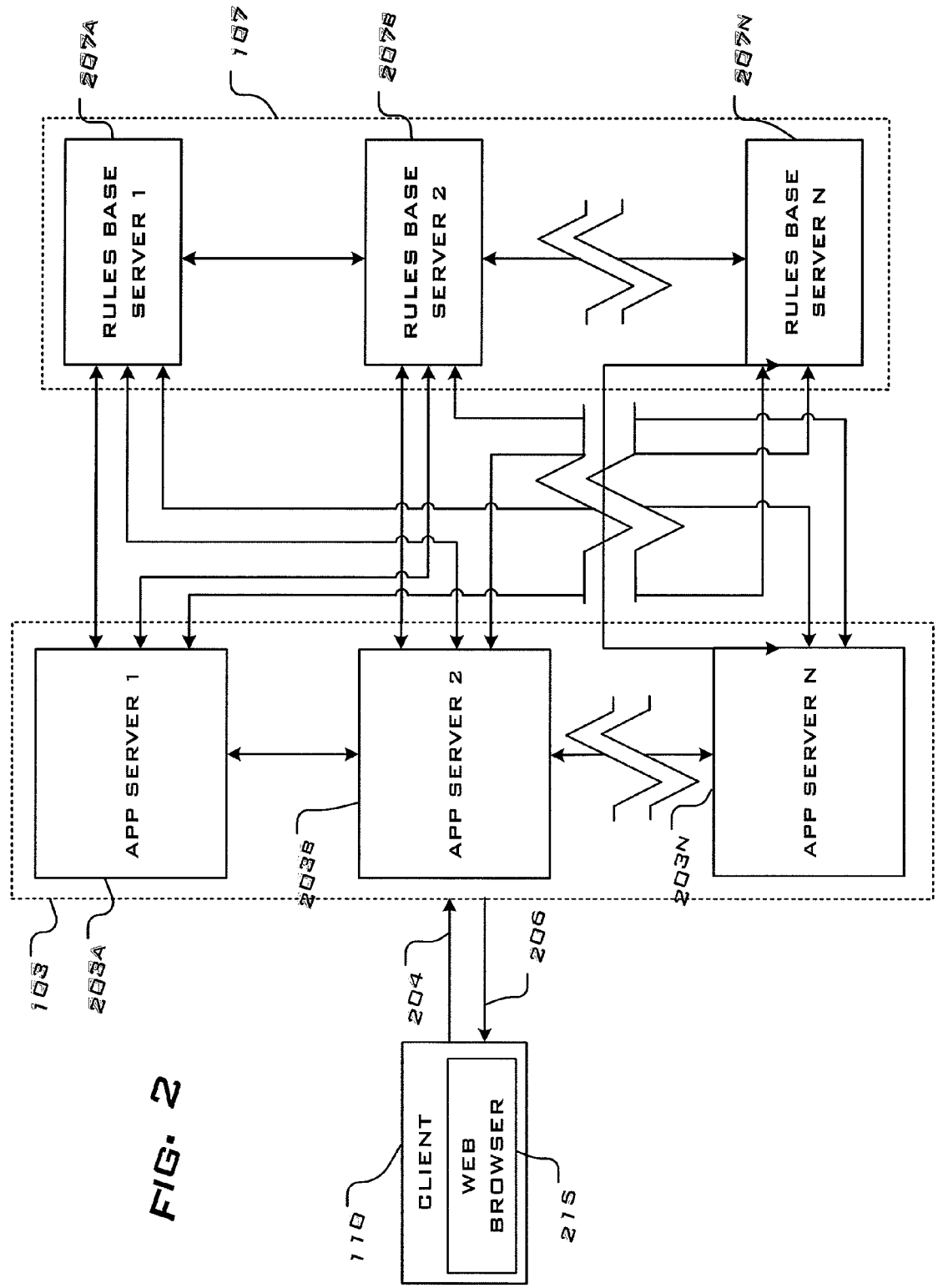
FIG. 2 is an illustration of an exemplary embodiment of a configuration of the application server and the rules base server indicated in FIG. 1.
Figure 3:
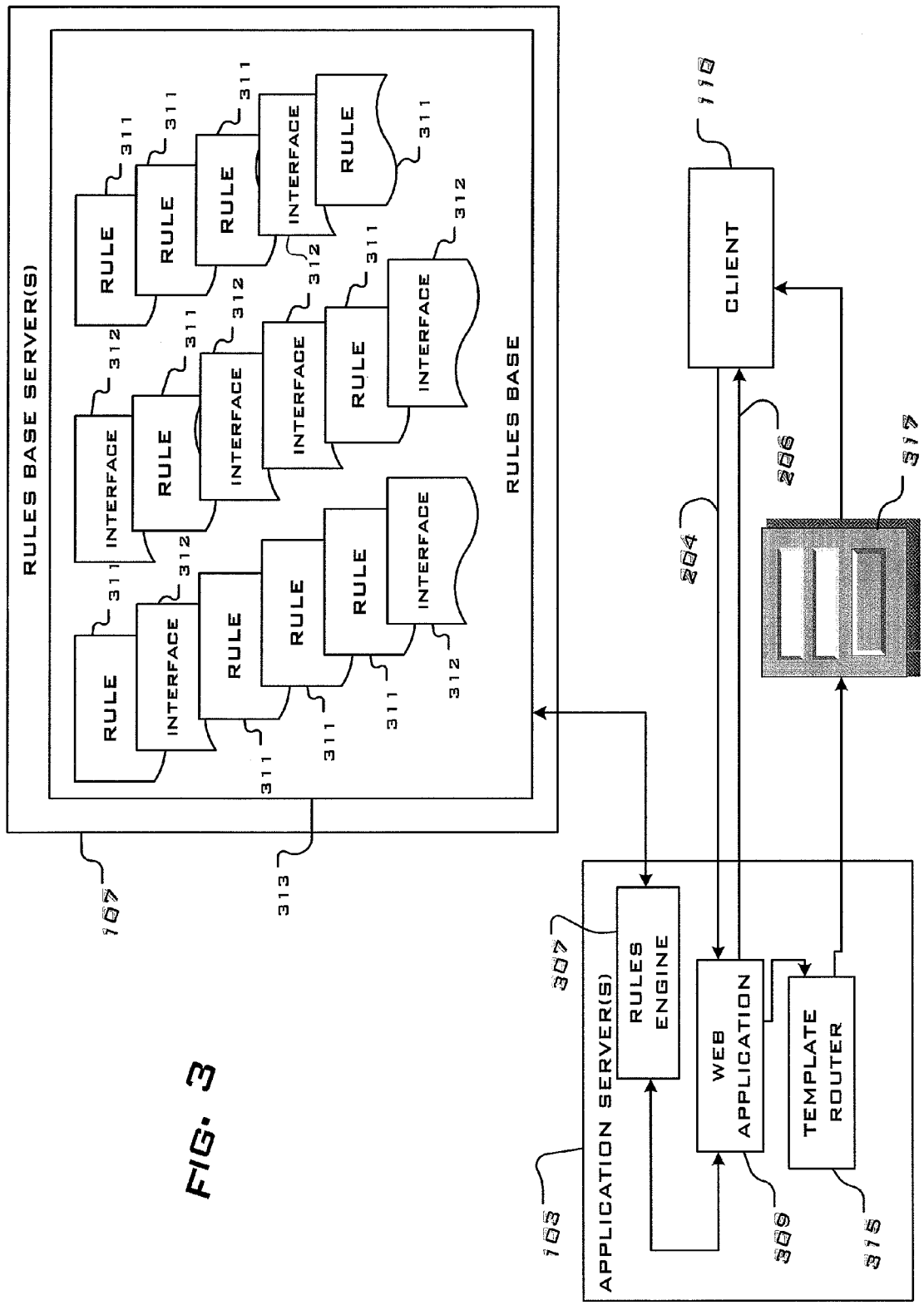
FIG. 3 illustrates the application server(s) and the rules base server(s) of FIG. 1 in greater detail.

FIGS. 1 through 3 illustrate an exemplary architecture 100 in which embodiments of the hereinafter disclosed system and method may operate. The network architecture 100 may include a computer-based application server 103 and one or more clients 110 connected via a network 101, which may be a private network (e.g., a local area network (LAN), wide area network (WAN), intranet, etc.) or a public network (e.g., the internet). A computer-based rules base server 107 may be connected with the application server and, as described in greater detail below, is configured with a data structure populated with rules 311. A third computer-based server is configured with a listing database 105 for storing data entered from a client 110 and is likewise connected with the application server 103. An non-limiting example of such a listing database 105 may be a real estate multiple listing service comprising a database of real property for sale accessible by real estate brokers, agents, and in some cases, the public. Such a data listing would preferably comprise a data object, record or target XXX which includes fields of data relevant to a piece of real property for sale, for example, as listed in the following table:

| Field | Values |
|---|---|
| Property Type 1 | Unimproved land, land plus building |
| Property Type 2 | Residential, commercial |
| Property Type 3 | Sale, Rental |
| Structure Type | Condo, Apartment, duplex, triplex, attached, detached, office, etc. |
| Area | Square Footage |
| Geolocation | Address, Geo-coordinates, etc. |
| Listing Price | Currency |
| School districts or schools | District name or school names |
| Number of rooms | Bedrooms, bath rooms, living rooms, etc. |
| Size of spaces | Room dimensions |
| Amenities | Pool, fireplace, appliances, common areas, etc. |
| Other Fields | Homeowner's Association, Property Tax Assessment, Seller Agent, multiple media (images or sounds) displaying or verbally describing the property, etc. |

It will be appreciated that other fields and values may be used in other embodiments.

Client 110 may be a computing device such as, for example, a desktop computer 110b, laptop computer 110c, server, a web-enabled cellular phone 110d, personal digital assistant (PDA) 110a, etc. In one embodiment, client 110 includes a browser (e.g., a web browser) that enables client 110 to access information maintained by, and use services provided by, application server 103. Browser 215 is an application that enables client 110 to display and interact with text, images, and other information provided by servers. Browser 215 may be a web browser configured to display web pages (e.g., by using hypertext transfer protocol (HTTP), extended markup language (XML), JavaScript, etc.). In an alternative embodiment, client 110 initiates service requests without use of a browser 215. Client 110 is accessed by a user 131 who is associated with an entity 130 and who enters data via the client 110. The entity 130A, B is collective body that uses the data to be entered and, therefore, has access to the listing database 105. However, the entity 130A defines requirements for data that may be different from requirements defined by other entities 130B that may have access to the listing database 105 through the network 101

Application server 103 may provide one or more services (e.g., database services, systems management services, network monitoring services, transactional services, webpage viewing services, etc.) to client 110. Application server 103 may be a front end server (e.g., that provides an interface to client 110) and/or a back end server. Through the application server 103, users of client 110 may request data, initiate actions, receive information, etc., via application service requests 204.

In one embodiment, application server 103 is a web application server, and is configured with a web application 309 that receives data entered from the client 110 through an application service request 204. Based on the contents of the application service request 204, application server 103 may determine that web application 309 should perform one or more actions, after which application server 103 may return an application service response 206 to the client 110. For example, the web application 309 provides through an application response 206 comprising validation of data entered from the client 110, feedback relating to invalid data or attempts to enter impermissible data, and data structure information retrieval and display services. Application server 103 may receive an application service request 204 from client 110. Though only a single web application 309 is shown, application server 103 may include multiple web applications 309 and/or other services.

In addition, application server 103 is further configured to store and execute a rules engine 307 for use in processing rules 311, retrieved from a rules base 313, in order to respond to (or propose responses to) events signaled to the engine. Rules engine 307 may be a logic component that processes rules 311 to produce outcomes. The rules engine 307 may match facts, data and rules 311, and infer conclusions which may result in actions or events. The rules engine 307 may match the facts, data and rules 311 using a variety of known algorithms.

Application server 103 is also configured with a template router 315 which stores a plurality of data entry templates 317 to be displayed on the client 110 in a web page. Each data entry template 317 may be custom-defined to render the web page according to entity 130 requirements for both appearance and data, and to illicit acceptable user information as determined by that entity 130. Selection of the correct data entry template is conducted according any of several dimensions, or identifying characteristics, associated with the user 131. In this regard, the template router 315 may include a rules engine logic with access to a database of dimensions and corresponding data entry templates. Exemplary dimensions include site name, URL, IP address, which are used to determine the entity 130 with which a user 131 is associated which then determines the rules by which the data is to be entered, user authority (which may be based on the class of the user 131, e.g., a broker, or an agent, and then resolve the directory path and file name of the proper template to be returned for rendering on the client 110 display.

Figure 4:
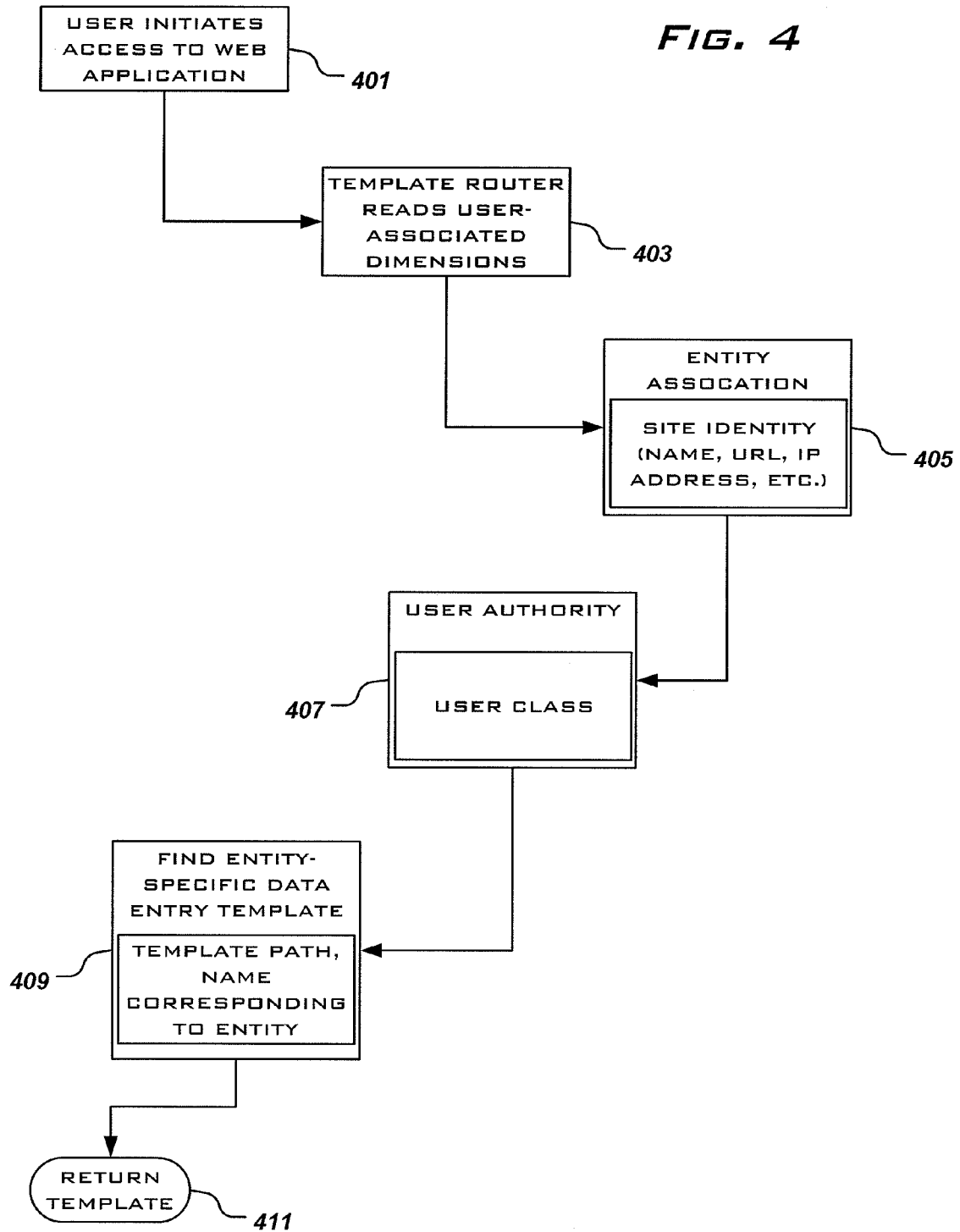
FIG. 4 is a flow chart of an exemplary method of providing a data entry template to a user according to one embodiment.

For example, with reference to FIG. 4, at 401 a user 131 from the Huntsville Board of Realtors® (an "entity" 130) accesses the web application 309 through client 110. The user 131 may be a real estate agent, for whom a certain set of authorizations for data entry and access may be defined, or a real estate broker, for whom broader authority may be defined. Web application 309 calls the template router 315 at step 403 which reads dimensions embodied in the access request which include dimensions pertaining to the entity 130 with which the user 131 is associated. Template router 315 determines at 405 the entity 130 whose rules govern the data entry is the Huntsville Board of Realtors based on dimensions corresponding to the user 131 and/or client 110. Template router 315 also determines the appropriate data entry authority possessed by the user 131 at 407, which may limit what types of data may be entered and whether previously entered data may be modified, etc. Based upon the entity 130 and the user authority, the template router 315 retrieves the entity/user specific data entry template at 409 and returns code 411 to the client 110 corresponding to the proper template 317 to be displayed to the user 131.

In the illustrated embodiment, selection of the proper template 411 can also include embedding in elements of the template web pages selected rules that might otherwise be executed by the rules engine 307 and that are relevant to a given context, for example, so that edits, automatic "showing" of sections and recalculations can be executed local to the client device, rather than in the rules engine 307 on the application server 103. One example of this is the pre-processing of user-entered data, selections and/or gestures, discussed below, thus, altering the user experience by changing the code running on the client device or by making the that device dynamically interact. In the foregoing regards, "context" refers to the context in which the requested web page will be communicated to and executed on the client device. That context can include, by way of non-limiting example, user "properties" (e.g., security permissions, age, locale, and so forth), client 110 properties (e.g., processor speed, display size, keyboard capabilities, and so forth), and communication channel properties (e.g., the speed and type of connection between client 110 and application server 103).

Based on these selections and configuration, the template router 315 constructs a markup language stream, e.g., in HTML or other conventional format or protocol. That stream (or, more accurately, markup language document) is transmitted by the application server 103, per convention, to the requesting client 110 for response by the user 131—in this case, completion of input fields 19A-19G. In the illustrated embodiment, the template router 315 constructs and forwards the stream to the browser 215 of client 110 substantially concurrently with its request for the corresponding web page, i.e., during the same online session on which that request was made and/or within the conventional time periods expected for response to a web page, though these are not requirements of the invention. The browser 215 of client 110 likewise substantially concurrently executes that stream for display to the user 131, e.g., within that same online session and/or within the conventional time periods expected for execution of a web page though, again, this is not a requirement of the invention. Thus, user 131 begins data entry by completing the data entry form 317 displayed on the web page. When the template is completed, user 131 executes a "submit action". As used here, a "submit action" is a user 131 action intended to signify that input fields [NEED DATA ENTRY TEMPLATE] of the data entry template 317 are completed (or sufficiently completed) and ready for submission to the application server 103. These are conventional actions known in the art, such as, user selection of a "submit button" (including, user selection of a designated radio button on the web page or user selection of a designated submit button on the web page), and/or user striking of the ENTER key (or the like) on the client 110.

In some embodiments, if the user 131 takes one of those submit actions with respect to data entry template 317, the user-entered data can be transmitted to the application server 103 by way of a conventional HTTP request 204.

In one embodiment, application server 103 comprises a plurality of application servers 203a-203n. Similarly, rules base server 107 may comprise a plurality of rules base servers 207a-207n. Preferably, each application server 203i is connected to each rules base server 207i as depicted in FIG. 2. In yet another embodiment, the plurality of rules base servers 207a-207n designate a primary rules base server 207a with the remaining rules base servers 207b-207n are secondary. If a new rule 311 is added, or an existing rule 311 is modified or deleted, the change is made only to the primary rules base server 207a. The primary rules base server 207a then promulgates the change(s) to the secondary rules base servers 207b-207n. To enhance reliability of access to the rules base server (s) 107, the server architecture is redundantly interconnected. If the designated primary server 207a goes offline or otherwise fails, the remaining secondary servers are configured to execute control logic 822 (described below) to designate a new primary server among them. Application server 103 and rules base server 107 may be co-located, or may be geographically remote from each other, mutually connected by a network 101. Furthermore, the plurality of application servers 203a-203n may be geographically distributed, and likewise the rules base servers 207a-207n may also be geographically distributed. For example, the plurality of application servers 203a-203n, and the rules base servers 207a-207n may be housed and maintained in a plurality of distributed data centers. It will be appreciated that this exemplary architecture enables expansion of the rules base 313 to accommodate increasing numbers of rules 311.

Rules base server 107 is configured with data structure for storing and retrieving rules 311, such data structure being referred to herein as a rules base 313. A rule 311 is an abstract data structure that describes a formal language precisely (e.g., a set of rules that mathematically delineates a (usually infinite) set of finite-length strings over a (usually finite) alphabet). Rules 311 may perform actions, provide information, help process messages, etc. A rule 311 may include conditional elements (e.g., and, or, not, exists, etc.), constraints (e.g., equal to, not equal to, greater than, contains, etc.) and consequences or actions (e.g., decrypt message, process next rule, forward message to application server, etc.). In one embodiment, a rule 311 defines a type, value(s), amount, among other characteristics of data that may be entered by the user. In another embodiment, a rule 311 calls other rules 311. Rule 311 may also perform other functions.

Rules 311 are preferably scripted. This can enable new rules to be added, and existing rules to be modified without requiring compiling, though, such rules 311 may be written in a non-scripted format. The logical operations associated with a particular rule context may include defining acceptable data type, validation comparisons of user-entered data against pre-defined data definitions and acceptable data values.

In one embodiment, the rules base 313 may be structured to be dimensionless collection of documents such as a document-oriented, NoSQL database. In other words, rules base 313 is data structure that does not comprise a schema typical of other databases. Accordingly, the order of the documents within the database is irrelevant. In this embodiment, the rules base 313 comprises a set of documents which may be a rule 311 or a rules interface 312. Rules 311 execute pre-defined logical operations, as described above, and return a result, which may be the result of logical operation, and may include pointers to call other rules 311 or rules interfaces 312 which are followed as part of rule execution. On the other hand, rules interfaces 312 may contain the names of rules 311 to be executed and other rules interfaces 312, but the interface 312 does not return a result as a rule 311 does. An interface 312 simply provides a logical interface in the data structure among other interfaces 312 and rules 311. Moreover, the interface 312 embodies code which initiates a search within itself for the names of rules 311 and interfaces 312, and finding a name, which may be defined by the code, the interface 312 calls the rule 311 or interface 312. This interface 312 code may define a logical operation may include a logical filter, for example, that informs the interface 312 which rule or interface name(s) to retrieve based upon the occurrence of a pre-defined condition. Therefore, where a rule 311 may be thought of as a document consisting of a logic operation that responds with a value, an interface 312 is a document consisting of a self-executing navigation junction within the data structure, for finding other interfaces 312 and ultimately rules 311 so that a value may be returned. Thus, interfaces 312 define a logical hierarchy of the rule 311 location and execution.

Figure 5:
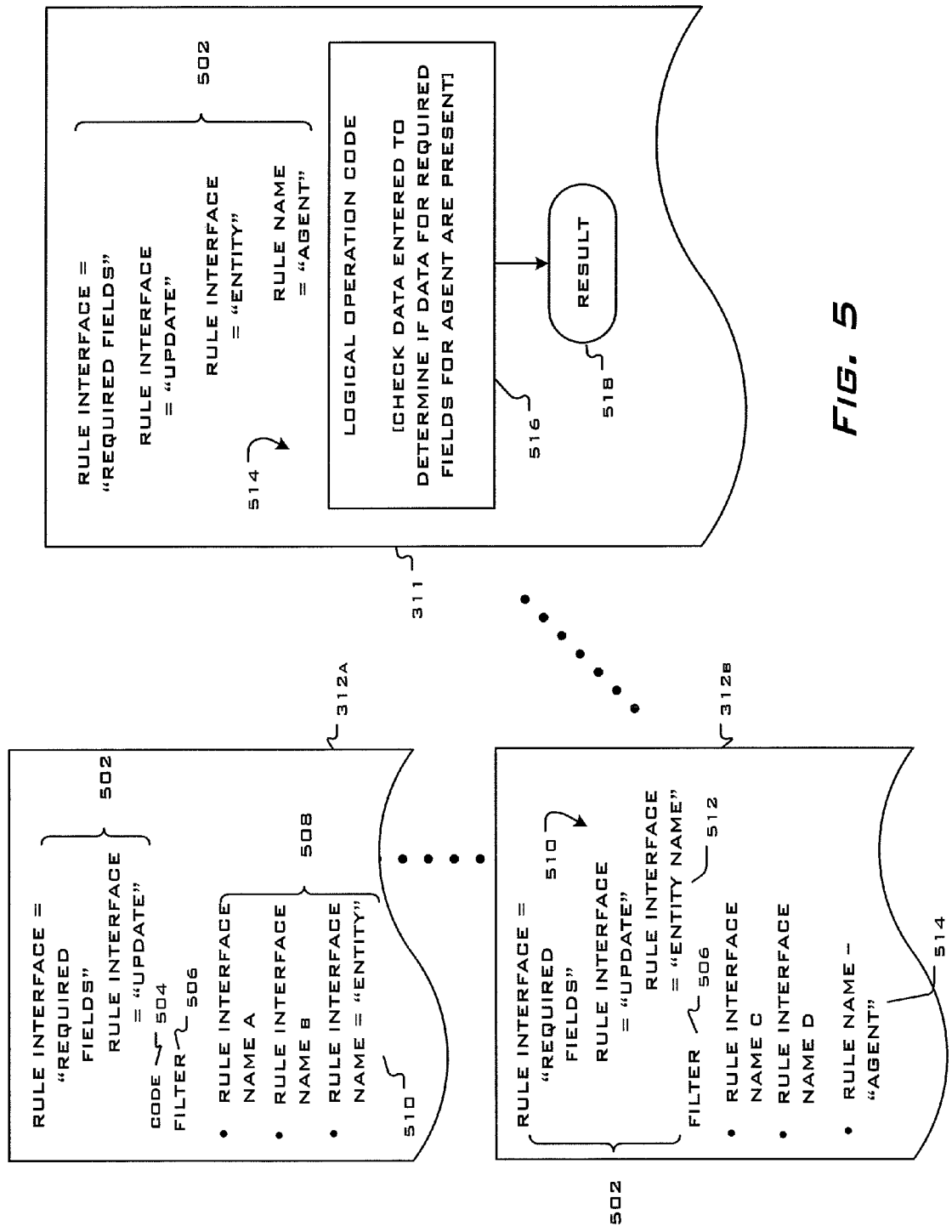
FIG. 5 depicts exemplary documents comprised with the rules base.

FIG. 5 illustrates an example. A rules interface 312a includes a name area 502 in which the name of the interface 312a is defined. In this example, interface 312a is defined as both "required fields" and "update" indicating that this interface 312a is called in response to the desire to update previously entered data of the required fields in the data entry template 317. Thus, the interface name 502 includes the name of the interface from which this interface 312a was called. Interface 312 is configured with self-executing code 504 which causes a search of its document 312a for pre-defined names of subordinate interfaces 312 or rules 311. Interface 312 may comprise a logic filter 506 the execution of which defines one or more names for which to search based upon a certain condition. In the present example, the interface 312 includes a set of names 508 of interfaces 312 (or rules 311) that may be called and executed. One such name 510 identifies an interface as "entity" and refers to another rule interface document 312 (not shown) that contains a set of rule interface names 508 corresponding to the various entities 130 that subscribe to the listing database 105.

In like fashion, the document named "entity" rule interface is executed and calls a rules interface 312b identified with the appropriate "entity name" 512 which corresponds to the entity 130 through which the user 131 may be accessing the application 307. This rules interface 312b likewise searches its document and may be configured with a filter 506 that depending a condition, searches for a name _____ corresponding to any one of a set of possible users 131, e.g., "anonymous," "consumer," "agent,' or "broker," that may be accessing the web application 307 under the entity 130 identified by "entity name." In this example, assuming the user 131 is an "agent" associated with the entity 130, the search will find and call the document named "agent" 514. The document "agent" 514 in this illustration is a rule 311 comprising logic operation code 516 that is executed and returns a result 518, which in this case will indicate whether the required fields that an agent of the named entity must complete when updating data according to the named entities rules.

The rules engine 307 executes an algorithm which evaluates whether a called document is an interface 312 or a rule 311. If the document is evaluated to be an interface 312, that called interface code is executed and a new name is searched for. Thus, the documents are evaluated recursively, until a rule is executed and a result is returned. Results of executed rules 311 may be appended to the end result as may be dictated by a rule's logic.

When the user 131 executes the "submit action," as described above, user-entered data is transmitted to the application server 103, and the web application 309 which calls the rules engine 307. Specifically, web application 309 responds to a request 204, e.g., received from the client 110 (e.g., by way of HTTP requests), by calling the rules engine 307 which accesses the rules base 313 from a rules base server 107 and calls applicable documents within the rules base 313 based upon document name objects embedded in the data entry template 317.

Figure 6:
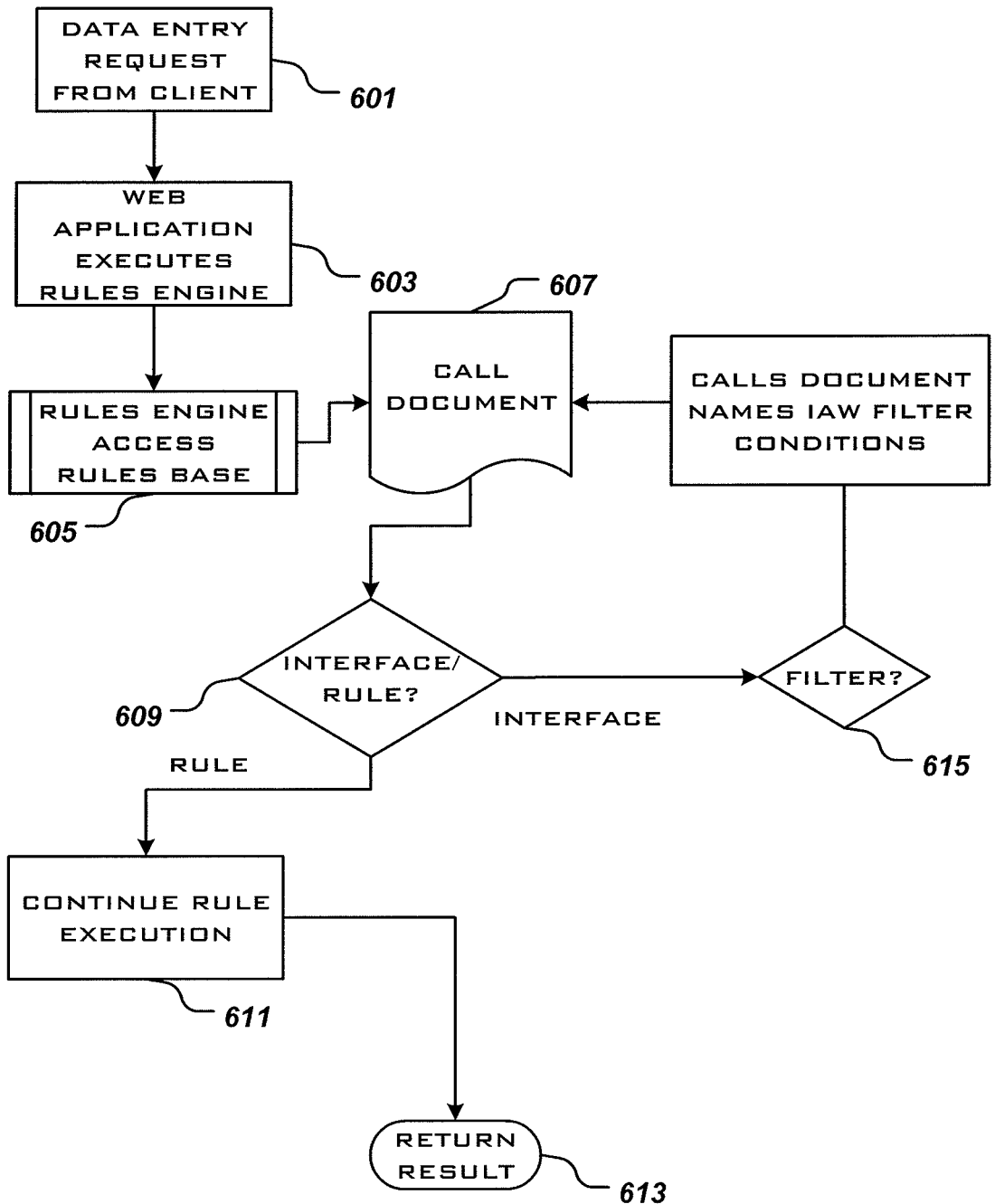
FIG. 6 is a flowchart of an exemplary method executed by the rules engine.

FIG. 6 provides a flowchart of an exemplary algorithm 600 employed by the rules engine 307. At the outset 601, web application 309 receives a request to enter data from a client 110 and then at 603 calls the rules engine 307. Next 605 the rules engine accesses the rules base 313 and begins to call a document 607. The first document called is identified by code embedded within the template 317 corresponding to the type of template 317 provided by the template router. The document is tested at 609 to determine whether it is an interface 312 or a rule 311. If the document is determined to be a rule 311, the rule 311 is executed 611 which returns a result at 613 reporting whether the conditions of the rule 311 were met. If the document is an interface 312, the document names contained in the interface 312 are called 607 and the process is executed recursively until the result of step 609 is that the document is a rule 311. As stated above, an interface 312 may define a logic filter 615 of certain document names that are to be called. If there is no filter defined, all document names associated with that interface are called, and the contents thereof are executed. Lastly, a rule 311 may include a pointer to another rule 311 or another interface 312. Therefore, upon conclusion of its execution, another interface may be called and the process 600, executing all applicable interfaces 312 and then rules 311 for a particular user 131, resulting in validation of data entered according to data requirements of the entity 130 with which the user 131 is associated.

The result will be a report to the user 131 rendered in a web page generated from a language readable by a browser 215 as earlier described which relays results of the validation testing of the data entered for the entire template 317. The report may be in the form of the template 317 with fields highlighted into which the incorrect type or value of data were entered. The report may also indicate to the user 131 why the attempted entry is not valid. In addition, a rule 311 may be configured to populate a data field within the template automatically, perhaps based on values of other fields. The result returned may include an indication that the field was automatically populated and why. For example, a field for "Schools" may be automatically filled with schools near the property being listed based on address, applicable ad valorem taxes may be accessed from the applicable local government records and input into the template, square footage of rooms may be calculated from dimension data input by the user, etc.

Upon validation of all data entered into the template 317, the rules engine 307 indicates this to the web application 309 which transfers the data to the listing database 105 where it is stored as a record. In some embodiments, the web application may provisionally save a partially-validated data entry template to allow later modification by a user 131.

Referring again to FIG. 1, the architecture may advantageously include an application program interface (API) which may be executed on a dedicated server 120 and allows entities 130C that program and manage a stand-alone listing database access to the data in the listing database 105 with the ability to enter data with validation through the web application 309 and the rules engine 307 as described above.

In an embodiment in which the rules base documents are scripted, the web application 309 may be configured to facilitate creation, amendment, and deletion of both rules interfaces 312 and rules 311. In a manner similar to that disclosed above, a user 131 may access the web application 309 on the application server 103 and initiate a request to manage the rules base 313. In some embodiments, the web application 309 may be configured to convey code to the client 110, as described above, to render a web page to be displayed on the browser 215 in which the user 131 is provided the option of either entering or modifying data pertaining to a listing for the listing database 105 or managing the rules base 313. Upon selection of the latter, web application will again call the template router which will render a rules base management template based upon dimensions derived from the user 131/ client 110. The rules base management template will be appropriate to the entity 130 with which the user is associated 131, and will only provide the ability to create, amend, or delete rules interfaces 312 and rules 311 over which the entity 130 is the cognizant authority. Accordingly, the entity 130 may have the ability to remotely configure its rules without contacting a central rules base administrator and without affecting operation of the rules engine for other entities.

It will be appreciated, however, that the authority of the user 131 to affect rules changes may be restricted. In one embodiment, rule 311 comprises a configuration field which may be used to set a minimum or maximum threshold for certain data, e.g., listing price, square footage, or the like. In such an embodiment, it may be preferred to allow entities 130 only the ability to alter the configuration value of a rule 311, but not allow entities 130 to alter the logic operation 516.

Figure 7A:
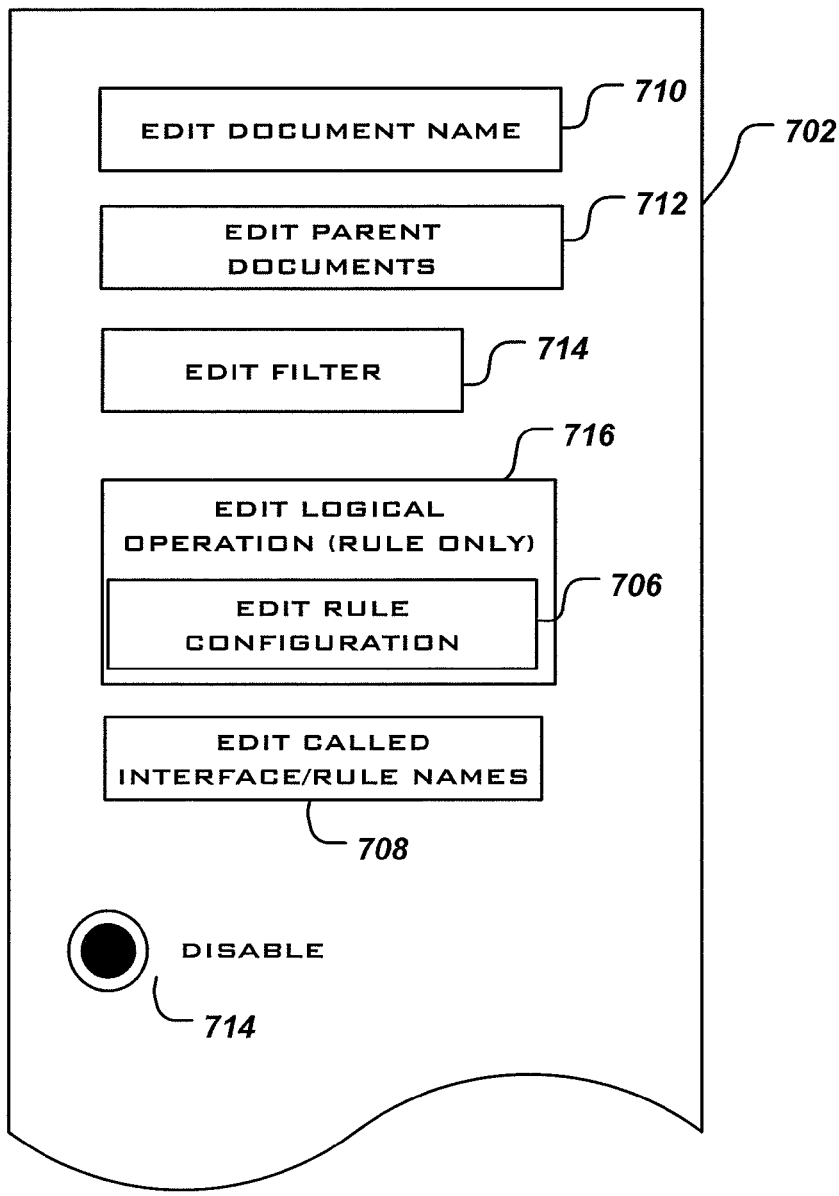
FIG. 7A is a document edit form.

With reference to FIG. 7, a process for enabling addition, deletion or alteration of rules 311 is illustrated beginning at 701 wherein a user 131 opts to manage rules base 313 and issues a request to do so via the web application 309. At 703, template router 311 is configured to compare user-associated dimensions, determine the entity 705 as described previously, and user authority 707 with respect to different aspects of rules base management, and issues an appropriate rules management web page 709. The rules management web page may include a submit action, described above, giving the user 131 the option to modify an existing rule or create a new rule. The user 131 then either selects 709 to modify or disable existing rules base document 711, or to create a new rules base document 713.

In the event user 131 selects to modify an existing document 711, a list of rules base documents is displayed 715 to which this user 131 has authority to modify according to the user's corresponding entity 130 and the user's role in the entity 130. The user selects the document desired to modify 717, and the template router 311, web application 309 or rules engine 307 causes a document editing form to be displayed 719. The document editing form 702 presents the user 131 with the fields that may be revised according to the user's authority. For example, one user may have authority to add or delete names 708 of rules interfaces 312 or rules 311 called by the document. Another user 131 may only have authority to change rule configuration thresholds 706. Yet another user 131 may be permitted to draft or edit rule 311 logical operation 716. The form 702 may also include a selection 714 to enable and disable a rules interface 312 or a rule 311. Additionally, the form 702 may contain fields to modify the document name 710, modify the parent document names 712, or modify the filter 718.

In the event the user 131 selects to add a new document 713 (rules interface 312 or rule 311), a new document form is presented 721 that gives the user 131 a code environment in which to create a rules interface 312 or a rule 311. The revisions or additions are submitted 723 through the web application 309 which calls rules engine 307 which accesses the rules base 313 according to the algorithm described above and validates the revised or added documents 725.

Figure 8:
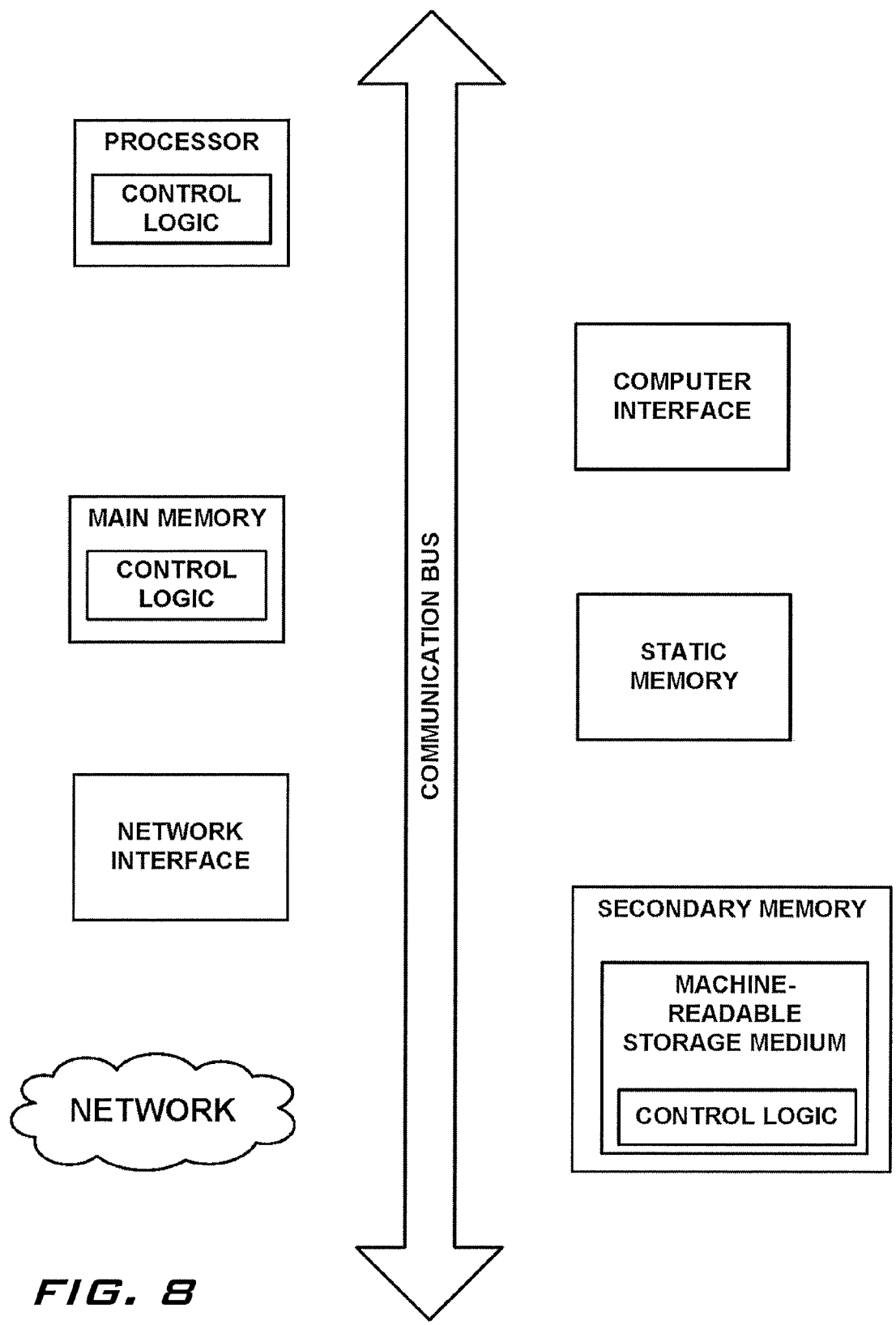
FIG. 8 is an exemplary computer-based system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802 and a main memory 804 (e.g., read-only memory (ROM), flash memory, dynamic random access memory (DRAM) such as synchronous DRAM (SDRAM) or Rambus DRAM (RDRAM), etc. Computer system 800 may also include a static memory 806 (e.g., flash memory, static random access memory (SRAM), etc.), and a secondary memory 818 (e.g., a data storage device), which communicate with each other via a communication bus 807.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the control logic 822 for performing the operations and steps discussed herein.

The computer system 800 may further include a network interface device 808. The computer system 800 also may include a computer interface 810 comprising output device, such as a display (e.g., touch-responsive screen, a light-emitting diode (LED) display, a liquid crystal display (LCD) or a cathode ray tube (CRT)), and an input device (e.g., a keyboard, or microphone).

The secondary memory 818 may include a machine-readable storage medium (or more specifically a computer-readable storage medium) 831 on which is stored one or more sets of instructions (e.g., control logic 822) embodying any one or more of the methodologies or functions described herein. The control logic 822 may also reside, completely or at least partially, within the main memory 804 and/or within the processing device 802 during execution thereof by the computer system 800, the main memory 804 and the processing device 802 also constituting machine-readable storage media. The control logic 822 may further be transmitted or received over a network 820 via the network interface device 808.

The machine-readable storage medium 831 may also be used to store the various databases and control logic described herein, and/or a software library containing methods that call such databases or control logic. While the machine-readable storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the system and method. The term "machine-readable storage medium" shall accordingly be taken to include, but not be limited to, solid-state memories, and optical and magnetic media.

Control logic 822 (also called computer programs or software) is stored in the main memory and/or secondary memory. Control logic 822 can also be received via the communications interface. Such control logic, when executed, enables the computer system to perform certain features of the system and method as discussed herein. In particular, the control logic, when executed, enables a control processor to perform and/or cause the performance of features of the system and method. Accordingly, such control logic 822 represents controllers of the computer system.

The processor 802, and the processor memory, may advantageously contain control logic 822 or other substrate configuration representing data and instructions, which cause the processor to operate in a specific and predefined manner as, described hereinabove. The control logic 822 may advantageously be implemented as one or more modules. The modules may advantageously be configured to reside on the processor memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like. Control logic 822 may be installed on the memory using a computer interface coupled to the communication bus which may be any suitable input/output device. The computer interface may also be configured to allow a user to vary the control logic, either according to pre-configured variations or customizably.

The control logic 822 conventionally includes the manipulation of data bits by the processor and the maintenance of these bits within data structures resident in one or more of the memory storage devices. Such data structures impose a physical organization upon the collection of data bits stored within processor memory and represent specific electrical or magnetic elements. These symbolic representations are the means used by those skilled in the art to effectively convey teachings and discoveries to others skilled in the art.

The control logic 822 is generally considered to be a sequence of processor-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for processor operations, and that these terms are merely conventional labels applied to physical quantities that exist within and during operation of the computer.

It should be understood that manipulations within the processor are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the processor or computers.

It should also be understood that the programs, modules, processes, methods, and the like, described herein are but an exemplary implementation and are not related, or limited, to any particular processor, apparatus, or processor language. Rather, various types of general purpose computing machines or devices may be used with programs constructed in accordance with the teachings described herein.

As described above and shown in the associated drawings, the system and method comprises a system and method for governing entry of data into a database that is commonly accessible by multiple entities, each of which have differing data requirements. While particular embodiments have been described, it will be understood, however, that invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the system and method.

What is claimed is:

1. A method using a computer-based machine configured with a rules engine for governing data entry into a database for storing sets of data, each set of data is associated with one of a plurality of entities, each of said plurality of entities having data rules that may vary according to entity, said method comprising:

receiving, by a first computer-based machine configured as an application server that includes a web application and a rules engine, a request to enter a set of data into said database;

searching a rules base stored on a second computer-based machine configured s a rules base server, said rules base comprising a plurality of documents, each of said plurality of documents being one of a rules interface and a rule, said rule comprising a rule name and a logical operation that returns a rule result indicating whether data comprised within said set of data is valid according to said logical operation, and said rules interface comprising a rules interface name and one or more call names consisting of one or more rule names and rules interface names of other rules interfaces and rules to be called upon execution of said rules interface, and wherein said rules interface names identify at least one of an entity corresponding to the entity associated with said request and a type of data to be entered; and compiling a result comprising a plurality of said rule results, said result indicating whether said set of data is valid according to requirements applicable to said entity; and wherein said step of searching said rules base comprises recursively calling a document; evaluating whether said called document is a rules interface or a rule; and if said document is a rules interface, calling said call names comprised within said rules interface; and if said document is a rule, executing said logical operation comprised within said rule; said step of searching completed when all rules applicable to said entity according to said rules interfaces have been executed.

2. The method according to claim 1 further comprising the steps of providing a data entry template comprising a set of fields corresponding to types of data comprised within said set of data, said data entry template corresponding to said entity.

3. The method according to claim 1, wherein said application server comprises a plurality of application servers.

4. The method according to claim 1, wherein said rules base server comprises a plurality of rules base servers.

5. The method according to claim 4, wherein said plurality of rules base servers are configured with control logic which causes said rules base servers to designate one of said plurality of rules base servers as a primary rules base server.

6. The method of claim 5, wherein said application server comprises a plurality of application servers.

7. The method of claim 1, wherein said set of data comprises one of a change to an existing document and an addition of a new document.

8. The method of claim 7, wherein said rules base server comprises a plurality of rules base servers and said plurality of rules base servers are configured with control logic which causes said rules base servers to designate one of said plurality of rules base servers as a primary rules base server, and wherein said set of data is stored within said rules base on said primary rules base server.

9. A computer-based system comprising:
   a rules base server comprising a data structure consisting of documents, said documents comprising a document name and being one of a rules interface and a rule;
   a listing database server comprising a listing database storing sets of data, each of said sets of data comprising data that are subject to requirements dictated by one of a plurality of entities;
   an application server in communication with said rules base server and said listing database server and configured with a web application and a rules engine, said rules engine configured to perform a method comprising the steps of:
      i. receiving from said web application a request to validate a set of data from an entity of said plurality of entities to be entered into said listing database;
      ii. searching said rules base server data structure for rules applicable to said set of data and corresponding to said entity by calling a document; evaluating whether said called document is a rules interface or a rule; and if said document is a rules interface, calling said call names comprised within said rules interface; and if said document is a rule, executing said logical operation comprised within said rule; and repeating said step of searching until all rules applicable to said entity have been executed; and
      iii. returning a result indicating whether said set of data is valid according to rules applicable to said entity;
   and wherein said web application is configured to convey a validated set of data to said listing database.

10. The system according to claim 9, wherein said application server further comprises a template router configured to provide a data entry template, said template comprising fields for entering a set of data applicable to said entity.

11. The system according to claim 9, wherein said application server comprises a plurality of application servers.

12. The system according to claim 9, wherein said rules base server comprises a plurality of rules base servers.

13. The system according to claim 12, wherein said plurality of rules base servers are configured with control logic which causes said rules base servers to designate one of said plurality of rules base servers as a primary rules base server.

14. The system according to claim 13, wherein said set of data comprises one of a change to an existing document and an addition of a new document and said plurality of rules base servers are configured with control logic which causes said rules base servers to designate one of said plurality of rules base servers as a primary rules base server, and wherein said set of data is stored within said rules base on said primary rules base server.

* * * * *